Figure 1:
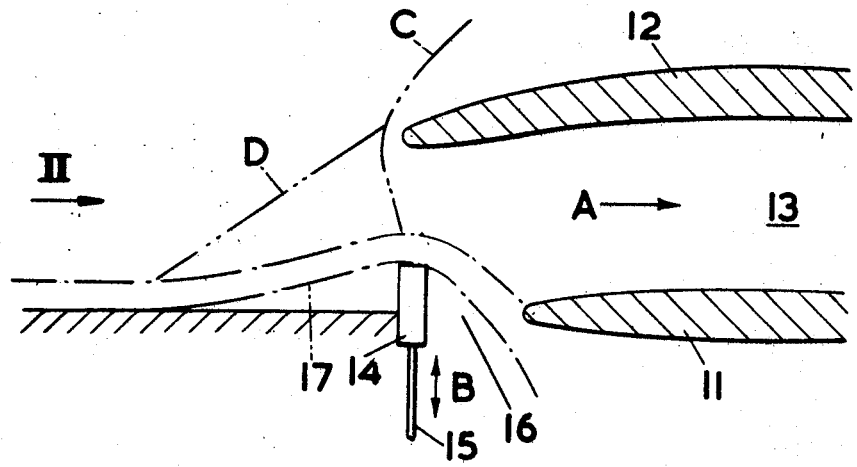

United States Patent

[11] 3,524,458

[72] Inventor Eustace Laurence Goldsmith
 Harrold, England
[21] Appl. No. 705,370
[22] Filed Feb. 14, 1968
[45] Patented Aug. 18, 1970
[73] Assignee Minister of Technology in Her Britannic
 Majesty's Government of the United
 Kingdom of Great Britain and Northern
 Ireland, London, England
[32] Priority Feb. 14, 1967
[33] Great Britain
[31] 6,916/67

[54] INTAKES FOR FLUID FLOW
 12 Claims, 8 Drawing Figs.
[52] U.S. Cl. ..................................................... 137/15.1
[51] Int. Cl. ............................................. F02b 27/00,
 F02c 7/04
[50] Field of Search ........................................... 137/15.1,
 15.0; 230/110G

[56] References Cited
UNITED STATES PATENTS
2,995,892 8/1961 Kosson .......................... 137/15.2
3,430,640 3/1967 Lennard ....................... 137/15.1

Primary Examiner— Alan Cohan
Attorney—Cameron, Kerkam and Sutton

ABSTRACT: The invention relates to fluid flow intake ducts particularly for aircraft engines for aircraft required to operate throughout a speed range embracing both subsonic and supersonic speeds and according to the invention an intake duct has a bluff forward facing wall or step movable transversely across the duct to deflect the boundary layer from an aerodynamic surface forward of said wall, said surface comprising for example part of the intake or the surface of a streamlined center body extending forward from the duct, and having a bleed aperture extending through the wall of the duct downstream of said movable wall through which some at least of the deflected boundary layer which passes over said movable wall flows away from the free mass of fluid flowing through the duct downstream of said wall.

Patented Aug. 18, 1970 3,524,458

Inventor

By

Attorney

Patented Aug. 18, 1970 3,524,458

Sheet 2 of 3

Inventor

By

Attorney 3,524,458

INTAKES FOR FLUID FLOW

This invention relates to fluid flow intake ducts.

The invention is particularly related to fluid flow intake ducts for aircraft engines for aircraft required to operate throughout a range embracing both subsonic and supersonic airspeeds; it is related to aircraft intake ducts of the type in which the boundary layer from an associated aerodynamic surface comprises part of the fluid flow into the duct.

Thus the invention relates to ducts having a central streamlined wedge like centre body extending forwardly beyond the duct leading edge from within the duct from which body the boundary layer flows into the duct; the invention also relates to so called side intake ducts of the type formed adjacent an aircraft fuselage, wing or tailplane and wherein part of the inner wall of the duct is defined by a continuation of the fuselage or the like within the duct and which fuselage or the like forms an aerodynamic surface forward of the intake, the boundary layer from which flows into the duct.

It is known that the configuration of an aircraft engine intake duct, for efficient operation at subsonic aircraft airspeeds, will differ from the configuration best suited for efficient operation at supersonic aircraft airspeed. In particular, if the dimension of the intake generally transversely of the direction of fluid flow is made sufficiently large whereby an intake required to operate at supersonic aircraft speeds will pass enough air at subsonic speeds, then this dimension will be too large at supersonic aircraft speeds; that is, at supersonic airspeeds, instead of operating with low flow spillage and low drag the intake will exhibit high spillage and high drag characteristics and unstable flow conditions may occur in the intake and downstream.

With a view to overcoming these difficulties it has previously been proposed to provide an aircraft engine intake of variable inlet area, the area being decreased for operation at supersonic speeds. Thus, in the case of an intake having a generally central wedge compression surface it has been proposed that provision be made to vary the effective area of the intake by causing the angle of the wedge compression surface to vary with changes in airspeed.

The present invention has for an object to provide an improved fluid flow intake duct of the type referred to which permits efficient operation of the duct at duct airspeeds in a range embracing both subsonic and supersonic airspeeds.

A fluid flow intake duct of the type referred to according to the present invention has a bluff forward facing wall or step movable generally transversely of the direction of fluid flow into the duct between a retracted position at subsonic airspeeds and an extended position at supersonic airspeeds, said movable wall when in the extended position being arranged to cause the boundary layer flow, which is attached at subsonic airspeeds to an associated aerodynamic surface forward of said movable wall, to leave said surface and having bleed means downstream of said movable wall for bleeding some at least of the deflected boundary layer flow which passes over said movable wall away from the free mass of fluid flowing through the intake downstream of said movable wall.

The transversely movable wall may be actuated either under manual control or automatically in accordance with variations in relative airspeed between the duct and air flowing into it.

The function of the wall or step is to cause the boundary layer from the associated aerodynamic surface forward of the wall or step to separate from said surface at supersonic airspeeds. From the point of separation springs one strong or several weaker oblique shock waves. A second shock forms either in the vicinity of the duct intake lip or mouth or downstream of it depending on the engine demands. The height of the wall determines the distance forward from the wall that the separation of the boundary layer from the surface takes place and this in turn controls the position of the oblique shock waves and hence the maximum flow into the intake duct.

Provision may be made for increasing the velocity of the boundary layer by blowing in the direction of fluid flow forward of said movable wall whereby the angle of separation of the boundary layer at said means is increased.

Provision may also be made, alone or in addition to the boundary layer blowing, for decreasing the thickness of the boundary layer and this may be achieved by means of boundary layer suction, preferably applied immediately forwards of said wall.

With a view to entraining as much as possible of the separated boundary layer to flow through the bleed aperture, fluid jets may be provided at the aft side of the wall or step and/or the rear edge of the bleed aperture which are directed outwardly through the aperture and act to entrain the boundary layer by an ejector action.

Also, structure defining the aft edge region of the bleed aperture may be movable in a sense transversely of the fluid flow through the duct to assist in entraining as much of the separated boundary layer as possible to flow through the bleed aperture. Thus, said edge region may comprise a section pivotally mounted at its aft end and arranged to swing about the pivot whereby its forward end swings into and out of the fluid flowing through the duct as may be required.

Figure 3:
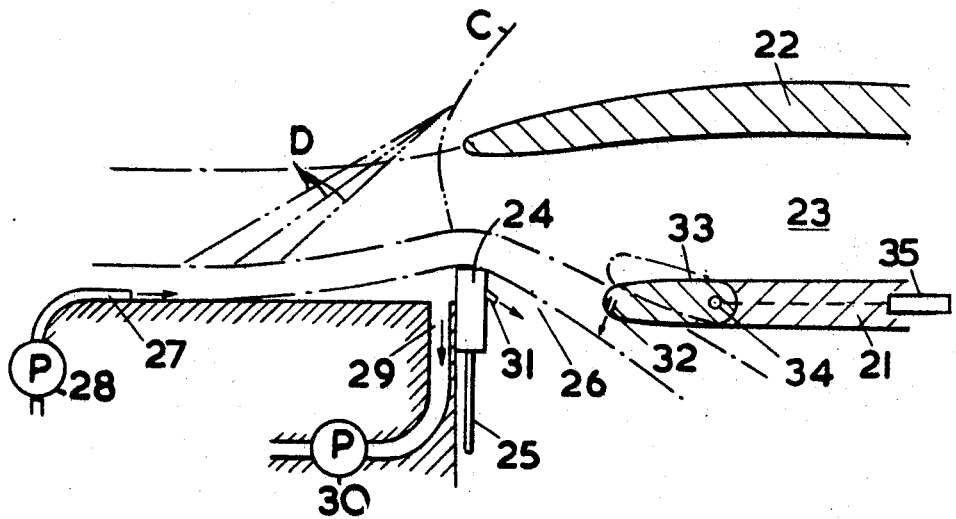
Figure 2:
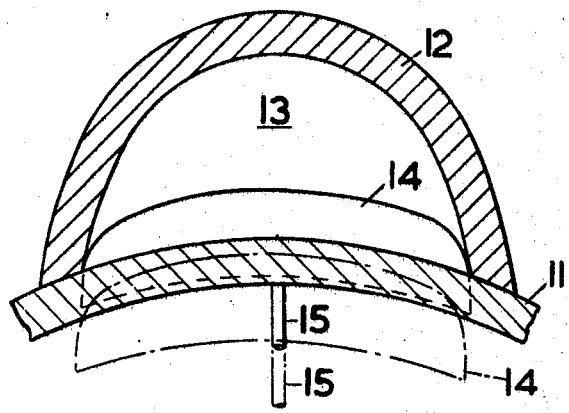
Figure 4:
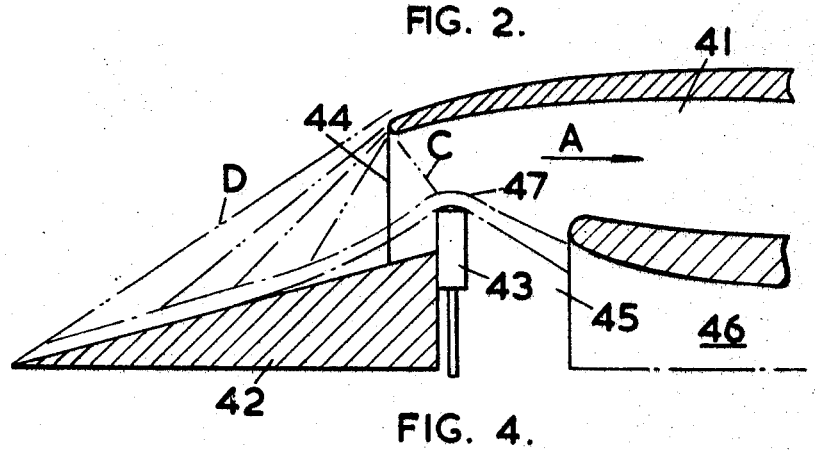
Figure 5:
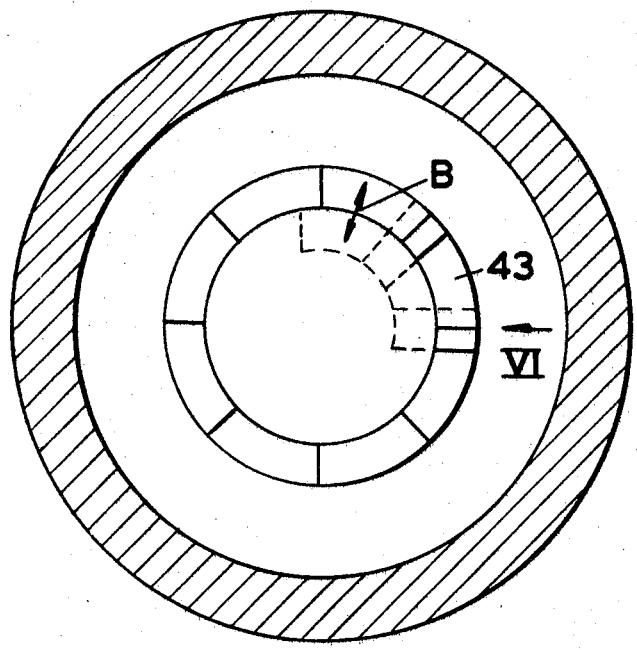
Figure 6:
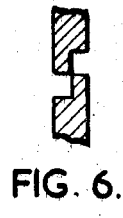
Figure 7:
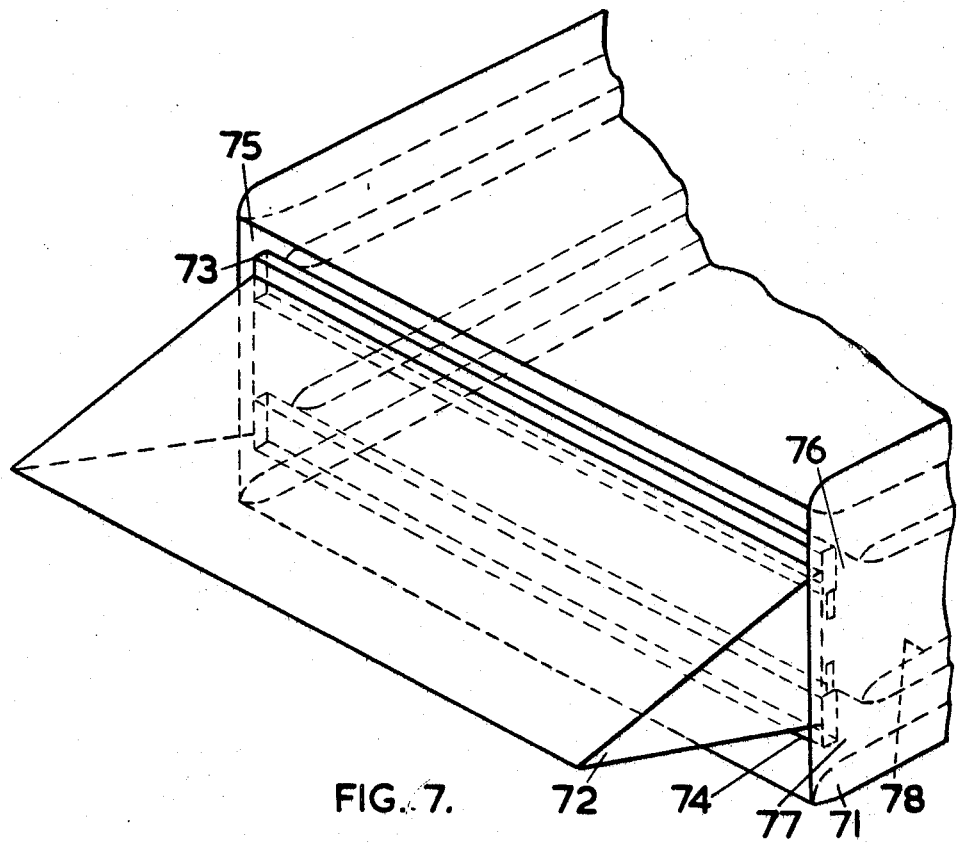
Figure 8:
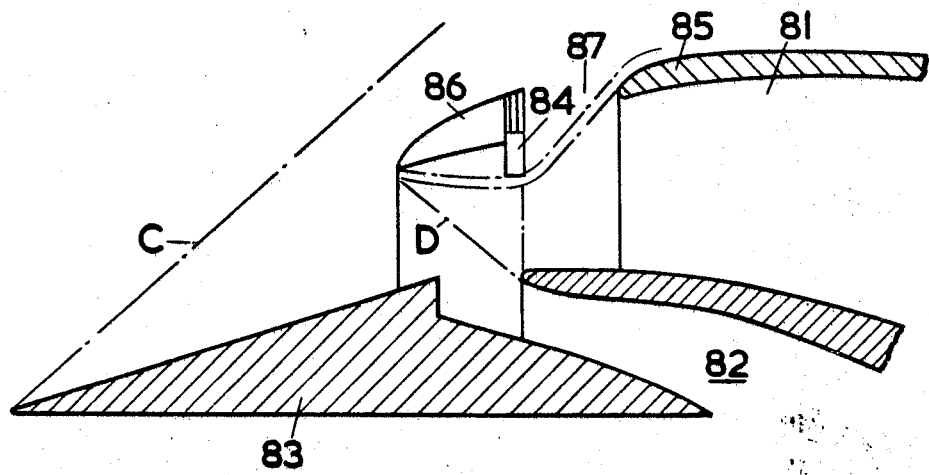

Five embodiments of the invention are illustrated by the accompanying diagrammatic drawings of which FIGURE 1 is a sectional plan view and, FIGURE 2 is an end view in the direction of the arrow II of FIGURE 1 of one embodiment, FIGURE 3 is a sectional plan view of a second embodiment, FIGURE 4 is a sectional half plan view, FIGURE 5 is an end view, in the direction of the arrow V of FIGURE 4, and, FIGURE 6 is a detail side view in the direction of the arrow VI of a third embodiment, FIGURE 7 is a pictorial view of a fourth embodiment and, FIGURE 8 is a sectional half side view of a fifth embodiment.

FIGURES 1 and 2 show part of the side of an aircraft fuselage at 11, 11 which together with a generally C shaped end section enclosure 12 define an intake duct 13. The direction of fluid flow through the duct is indicated by the arrow A. A step or wall 14 is mounted in the fuselage and is movable generally transversely of the direction of fluid flow as indicated by the arrows B. As shown in FIGURE 1, the forwardly facing side of wall 14 is bluff, i.e. substantially perpendicular to the flow of fluid through the duct 13.

An input control member 15 operable under manual control by the pilot, or automatically in accordance with variations in airspeed, affords an input drive to the wall 14. A bleed aperture 16 is provided downstream of the wall 14.

In operation, at subsonic speeds the wall is retracted into the fuselage as shown by the dotted lines of FIGURE 2 to provide a maximum intake area for the duct. At supersonic speeds the wall is moved to protrude into the airstream as shown in full lines. The degree of protrusion, which will vary according to variations of supersonic speeds, will ideally be sufficient to cause boundary layer separation from the fuselage as shown by the dotted lines 17 which represent the boundary layer. This separation of the boundary layer produces an aerodynamic wedge which forms a desirable double shock wave compression system, the shock waves being shown at C and D, respectively. After passing over the wall the boundary layer is, to some extent at least, drawn out of the duct through the bleed aperture 16 as shown, leaving smooth fluid flow conditions in the duct downstream of the wall 14.

FIGURE 3 shows the same basic layout to that of FIGURE 1 having a fuselage part 21, 21, enclosure 22, duct 23, wall 24, input member 25 and bleed aperture 26. Additional features are shown which, either alone or in combination lead to improved aerodynamic efficiency. Small blowing jets, one of which is shown at 27 are fed with air under pressure from a pump 28 the flow from the jets acting to increase the velocity of the boundary layer with a view to steepening the angle of separation.

At least one additional bleed aperture 29 through which suction may be applied by a pump 30 is located upstream and preferably adjacent the wall 24. By this application of suction the thickness of the boundary layer may be reduced with corresponding reduction in disturbance of the fluid flowing into the duct.

It is desirable that the boundary layer which passes over the wall 24 should be induced to pass out through the bleed aperture 26 and to this end by blowing with a pump (not shown) through jets at 31 and/or 32, the separated boundary layer may be entrained by ejector action to pass through the aperture 26. Equally the aft edge region of the bleed aperture 26 may comprise a section 33 which is pivoted at 34 and movable by power means 35. At supersonic speeds the section is pivoted about 34 towards the position shown in dotted lines to afford further inducement to the separated layer to pass out through the aperture 26.

With this arrangement a main shock wave is formed at C and a series of secondary oblique shock waves at D...D.

FIGURES 4, 5 and 6 show an intake duct 41 of the type having a streamlined conical wedge like centre body 42. A series of interfitting wall members 43...43 are mounted on the centre body 42 slightly downstream of the plane defined by the forward edge 44 of the duct 41. Provision is made for moving the members 43...43 radially inwards and outwards as indicated by the arrow B. The ends of the members 43 are stepped, as indicated at FIGURE 6, to allow the members to interfit in the retracted inward position. An annular bleed orifice 45 is provided downstream of the members 43...43 and feeds into the interior of a downstream hollow centre body 46.

Operation is the same as the that described with reference to FIGURES 1 and 2 the members 43...43 being retracted at subsonic speeds as shown by the dotted lines and being extended, as shown by the full lines, at supersonic speeds. At supersonic speeds the boundary layer shown at 47 is forced to separate from the conical centre body 42 as shown and after passing over the extended members 43 . . . 43 passes, at least partially, out through the bleed orifice 45 and into the interior of the hollow centre body 46. The shock wave system formed is as shown at C and D.

FIGURE 7 shows a rectangular cross section intake duct 71 having a centre wedge like body 72. Moveable walls or steps 73, 74 are provided at the upper and lower surface of the wedge, respectively and are located just downstream of the plane defined by the leading edge 75 of the intake duct 71. Bleed apertures 76, 77 are provided immediately downstream of the moveable walls 73, 74 respectively and feed into an inner duct 78.

Operation is similar to that described with respect to the previous FIGURES, the boundary layer being forced to separate from the centre wedge body 72 at supersonic speeds with the walls 73, 74 extended and being drawn out, at least partially through the bleed apertures 76, 77 and into the inner duct 78.

FIGURE 8 shows an intake duct of the type known as a combined internal-external compression intake having a main duct 81, a central bleed duct 82 and a streamlined centre body 83; that is to say the general configuration is similar to that of FIGURE 7. In this case, however, a moveable wall or step 84 is supported on the outer wall 85 of the main duct 81 at the rear of a lip portion 86 and a bleed aperture 87 is provided immediately downstream of the wall 84.

At supersonic speeds the moveable wall 84 is extended in the position shown and causes the boundary layer to separate from the lip portion 86. After passing over the wall 84 the boundary layer is, at least partially, drawn out through the bleed aperture 87 and a shock wave system as shown at C and D is formed.

The embodiment shown at FIGURE 8 is applicable to either a rectangular cross section intake as shown at FIGURE 7 or a circular intake as shown for example at FIGURE 4, 5 and 6.

I claim:

1. A fluid flow intake duct of the side intake type in which the duct is defined by a wall adjacent part of an aircraft structure, such as a fuselage, wing or tailplane, and said part of said structure, which structure forwards of the duct so defined forms an aerodynamic surface the boundary layer from which flows into the duct and having
    a bluff forward facing wall or step movable transversely of the direction of fluid flow into the duct in the upstream region of the duct from a retracted position to an extended position, and
    means defining a bleed aperture through the wall of the duct downstream of said movable wall,
    said movable wall being held in the retracted position at subsonic airspeeds and being extended at supersonic airspeeds at which extended position the boundary layer flow, which at subsonic airspeeds is attached to the wall of the duct upstream of said movable wall, is caused to separate from said upstream wall and to flow over said movable wall whereafter part at least of said separated boundary layer flows out through said bleed aperture.

2. A fluid flow intake duct as claimed in Claim 1 having blowing means associated with the boundary layer forward of said movable wall and means for supplying air under pressure through said blowing means to increase the velocity of the boundary layer and to steepen the angle of separation.

3. A fluid flow intake duct as claimed in Claim 1 having an outlet passage in the wall of the duct upstream of said movable wall, to which wall the boundary layer is attached at subsonic airspeeds, and means for applying suction through said passage at supersonic airspeeds to reduce the thickness of the boundary layer.

4. A fluid flow intake duct as claimed in Claim 1 having power means for supplying air under pressure and jets for directing air under pressure from said power means through said bleed aperture at supersonic airspeeds whereby part at least of the boundary layer flowing over said movable wall is entrained by ejector action to pass through said bleed aperture.

5. A fluid flow intake duct as claimed in Claim 1 in which the downstream region of the means defining said bleed aperture comprises a movable section, having pivotal support means at its downstream region and power means are provided for pivotally moving said section at supersonic speeds so that its upstream region protrudes into the intake, said section acting to induce some at least of the boundary layer to pass through said bleed aperture.

6. A fluid flow intake duct as claimed in Claim 1 having blowing means associated with the boundary layer forward of said movable wall and means for supplying air under pressure through said blowing means to increase the velocity of the boundary layer and to steepen the angle of separation, and outlet passage in the wall of the duct upstream of said movable means, to which wall the boundary layer is attached at subsonic airspeeds, and means for applying suction through said passage at supersonic airspeeds to reduce the thickness of the boundary layer, power means for supplying air under pressure and jets for directing air under pressure from said power means through said bleed aperture at supersonic airspeeds whereby part at least of the boundary layer flowing over said movable wall is entrained by ejector action to pass through said bleed aperture, and in which the downstream region of the means defining said bleed aperture comprises a movable section, having pivotal support means at its downstream region and power means are provided for pivotally moving said section at supersonic speeds so that its upstream region protrudes into the intake, said section acting to induce some at least of the boundary layer to pass through said bleed aperture.

7. A fluid flow intake duct of the type having a central streamlined wedge like centre body extending forwardly from within the duct beyond the duct leading edge in which the duct is defined between the surface of the centre body and a surrounding wall, said forwardly extending portion of the centre body forming an aerodynamic surface the boundary layer from which flows into the duct and having

- a bluff forward facing wall or step movable transversely of the direction of fluid flow into the duct in the upstream region of the duct from a retracted position to an extended position, and
- means defining a bleed aperature through the wall of the duct downstream of said movable wall,
- said movable wall being held in the retracted position at subsonic airspeeds and being extended at supersonic airspeeds at which extended position the boundary layer flow, which at subsonic airspeeds is attached to the wall of the duct upstream of said movable wall, is caused to separate from said upstream wall and to flow over said movable wall whereafter part at least of said separated boundary layer flow flows out through said bleed aperature.

8. A fluid flow intake duct as claimed in Claim 7 having blowing means associated with the boundary layer forward of said movable wall and means for supplying air under pressure through said blowing means to increase the velocity of the boundary layer and to steepen the angle of separation.

9. A fluid flow intake duct as claimed in Claim 7 having an outlet passage in the wall of the duct upstream of said movable wall, to which upstream wall the boundary layer is attached at subsonic airspeeds, and means for applying suction through said passage at supersonic airspeeds to reduce the thickness of the boundary layer.

10. A fluid flow intake duct as claimed in Claim 7 having power means for supplying air under pressure and jets for directing air under pressure from said power means through said bleed aperture at supersonic airspeeds whereby part at least of the boundary layer flowing over said movable wall is entrained by ejector action to pass through said bleed aperture.

11. A fluid flow intake duct as claimed in Claim 7 in which the downstream region of the means defining said bleed aperture comrises a movable section, having pivotal support means at its downstream region and power means are provided for pivotally moving said section at supersonic speeds so that its upstream region protrudes into the intake, said section acting to induce some at least of the boundary layer to pass through said bleed aperture.

12. A fluid flow intake duct as claimed in Claim 7 having blowing means associated with the boundry layer forward of said movable wall and means for supplying air under pressure through said blowing means to increase the velocity of the boundary layer and to steepen the angle of separation, an outlet passage in the wall of the duct upstream of said movable wall, to which upstream wall the boundary layer is attached at subsonic airspeeds, and means for applying suction through said passage at supersonic airspeeds to reduce the thickness of the boundary layer, power means for a supplying air under pressure and jets for directing air under pressure from said power means through said bleed aperture at supersonic airspeeds whereby part at least of the boundary layer flowing over said movable wall is entrained by ejector action to pass through said bleed aperture, and in which the downstream region of the means defining said bleed aperture comprises a movable section, having pivotal support means at its downstream region and power means are provided for pivotally moving said section at supersonic speeds so that its upstream region protrudes into the intake, said section acting to induce some at least of the boundary layer to pass through said bleed aperture.